United States Patent
Yusa et al.

(10) Patent No.: US 7,712,695 B2
(45) Date of Patent: May 11, 2010

(54) SPOOL BRAKING DEVICE FOR FISHING REEL

(75) Inventors: Isao Yusa, Tomiya (JP); Toshiaki Ito, Sendai (JP); Yoshihiko Okuyama, Tomiya (JP)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/170,436

(22) Filed: Jul. 10, 2008

(65) Prior Publication Data

US 2010/0006686 A1 Jan. 14, 2010

(51) Int. Cl.
*A01K 89/0155* (2006.01)

(52) U.S. Cl. .............................. 242/289; 242/223; 43/4

(58) Field of Classification Search ................. 242/286, 242/289, 223; 43/4
See application file for complete search history.

(56) References Cited

U.S. PATENT DOCUMENTS

| | | | | |
|---|---|---|---|---|
| 4,402,470 A | * | 9/1983 | Hamayasu | 242/286 |
| 4,718,617 A | * | 1/1988 | Vadasz et al. | 242/243 |
| 5,560,560 A | * | 10/1996 | Hirose | 242/223 |
| 5,577,679 A | * | 11/1996 | Thomas | 242/286 |
| 5,833,156 A | | 11/1998 | Park et al. | |
| 6,412,722 B1 | * | 7/2002 | Kreuser et al. | 242/288 |
| 6,584,722 B1 | * | 7/2003 | Walls et al. | 43/4 |
| 6,591,222 B2 | * | 7/2003 | Stiner | 702/173 |
| 6,758,006 B1 | * | 7/2004 | Walls et al. | 43/4.5 |
| 6,983,907 B2 | * | 1/2006 | Ikuta et al. | 242/288 |
| 7,021,140 B2 | * | 4/2006 | Perkins | 73/493 |
| 7,225,102 B2 | * | 5/2007 | Stiner et al. | 702/173 |
| 7,234,351 B2 | * | 6/2007 | Perkins | 73/493 |
| 7,434,757 B2 | * | 10/2008 | Beckham | 242/223 |
| 7,562,488 B1 | * | 7/2009 | Perkins et al. | 43/17 |
| 2009/0095835 A1 | * | 4/2009 | Beckham | 242/286 |

* cited by examiner

Primary Examiner—Evan H Langdon
(74) Attorney, Agent, or Firm—Charles Bergere (57) ABSTRACT

A spool braking device and a spool braking method for increasing spool braking capability. The spool braking device includes a reel attached to a fishing rod in a detachable manner. A rotatable spool is arranged in the reel. A fishing line is wound to the spool. A brake mechanism electronically brakes rotation of the spool. An acceleration sensor detects swing acceleration produced when the fishing rod is swung and generates an acceleration signal. A brake control unit determines whether or not the spool needs to be braked based on the acceleration signal and drives the brake mechanism.

15 Claims, 4 Drawing Sheets

SPOOL BRAKING DEVICE FOR FISHING REEL

BACKGROUND OF THE INVENTION

The present invention relates to a spool braking device for a double bearing reel.

A typical double bearing reel includes a reel body, which is attached to a fishing rod, and a line winding spool, which is attached to the reel body in a rotatable manner. When used by a person, such as a beginner, who is not accustomed to a double bearing reel (hereinafter referred to as "reel"), a backlash may be produced when casting the fishing line.

Normally, backlash is produced when the spool rotates at a speed that is higher than the speed at which the fishing line is drawn out of the spool (hereinafter referred to as "line speed"). More specifically, when the spool rotation speed exceeds the line speed, the spool overly continues to rotate even after the fishing line hits water. This entangles the fishing line in the spool.

To prevent such backlash, for example, U.S. Pat. No. 5,833,156 discloses an automatic brake system controlled by a microcomputer. The automatic brake system includes a rotation detector, which detects the rotation speed of the spool, an acceleration sensor, which detects the line speed, and a brake mechanism, which uses magnetic force to control the rotation speed of the spool. When the spool rotation speed exceeds the line speed, the microcomputer drives the brake mechanism and increases the spool braking force. The microcomputer also determines when the fishing line will hit water from a detection value of the line speed to apply full braking on the spool.

However, in the above-described prior art that controls the braking of the spool just by detecting the line speed and the spool rotation speed, there is a limit to the braking capability. Particularly, in the prior art, the acceleration sensor is connected to the fishing line. Accordingly, the acceleration sensor detects the line speed only when the fishing line is being cast. Further, there is another example in the prior art in which a height sensor is used in lieu of the acceleration sensor. However, the height sensor also detects only the line speed. Thus, in each prior art example, spool braking is performed only when the spool rotation speed exceeds the line speed or when the fishing line hits water (i.e., line speed becomes zero). Further, in the prior art, the braking timing for when the fishing line hits water is determined from the detection of the line speed. Therefore, backlash prevention control is performed after the fishing line actually hits water. This slightly delays the timing in which backlash prevention control is actually performed.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

The present invention provides a spool braking device and a spool braking method that increases spool braking capability.

One aspect of the present invention is a spool braking device for a fishing reel attached to a fishing rod in a detachable manner for use with a fishing line. The spool braking device includes a rotatable spool arrangeable in the reel for winding with the fishing line. A brake mechanism electronically brakes rotation of the spool. An acceleration sensor detects swing acceleration produced when the fishing rod is swung and generates an acceleration signal. A brake control unit drives the brake mechanism. The brake control unit determines whether or not to brake the spool based on the acceleration signal.

A further aspect of the present invention is a fishing device for use with a fishing line. The fishing device includes a fishing rod and a fishing reel attached to the fishing rod in a detachable manner. The fishing rod includes an acceleration sensor for detecting swing acceleration produced when the fishing rod is swung and generating an acceleration signal. The reel includes a spool for winding the fishing line, a brake mechanism for electronically braking rotation of the spool, and a brake control unit for driving the brake mechanism. The brake control unit determines whether or not the spool needs to be braked based on the acceleration signal.

Another aspect of the present invention is a method for controlling braking of a rotatable spool arranged in a fishing reel. The reel is attached to a fishing rod in a detachable manner, and the reel includes a brake mechanism for electronically braking rotation of the spool. The method includes generating an acceleration signal using an acceleration sensor to detect swing acceleration produced when the fishing line is swung, and driving the brake mechanism by determining whether or not to brake the spool based on the acceleration signal.

Other aspects and advantages of the present invention will become apparent from the following description, taken in conjunction with the accompanying drawings, illustrating by way of example the principles of the invention.

Figure 1:
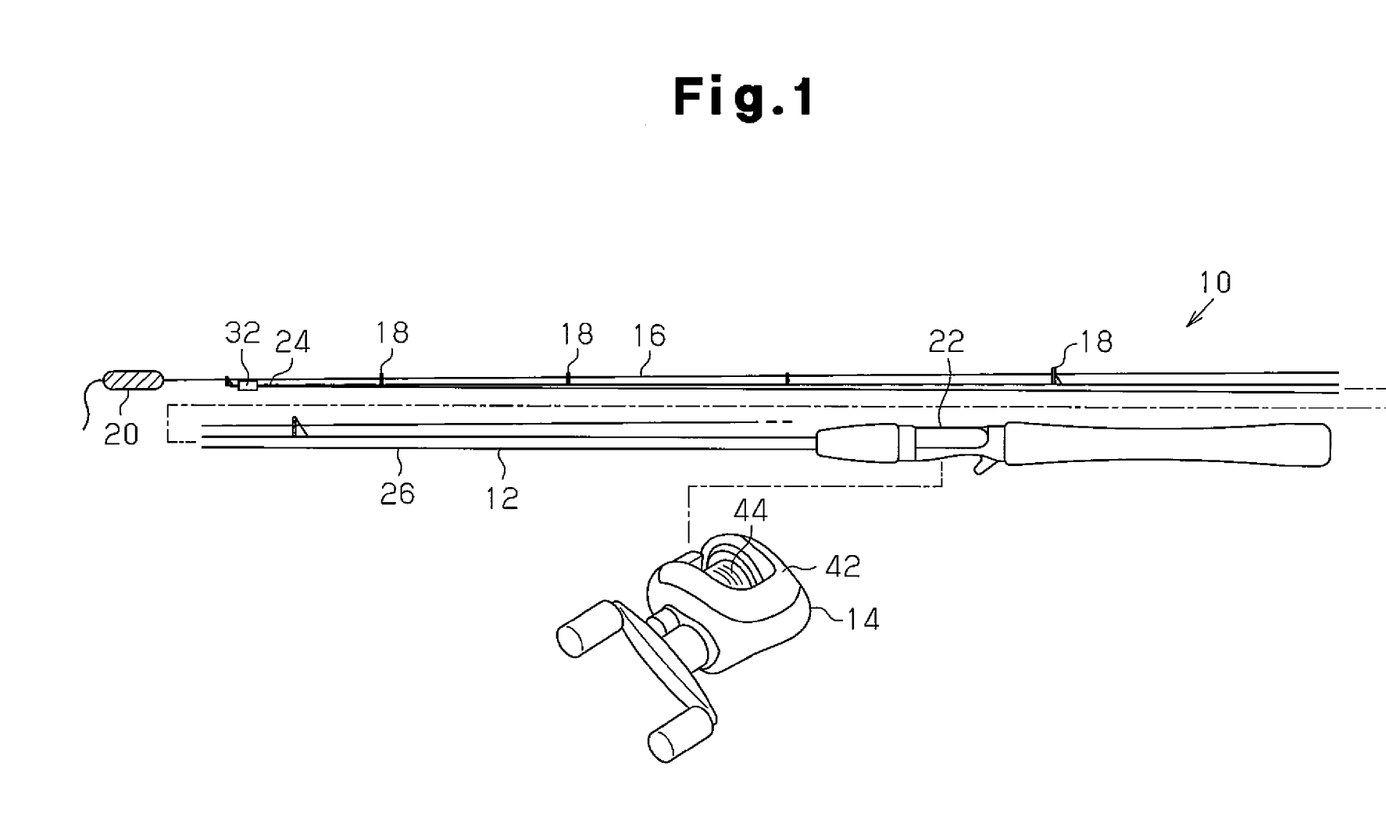
FIG. 1 is a schematic diagram entirely showing a preferred embodiment of a fishing device according to the present invention.

A fishing device 10 equipped with a preferred embodiment of a spool braking device according to the present invention will hereinafter be discussed with reference to the drawings. FIG. 1 is a schematic diagram entirely showing the fishing device 10, which includes a fishing rod (hereinafter referred to as "rod") 12 and a double bearing reel (hereinafter referred to as "reel") 14. The reel is attached to the rod 12 in a detachable manner.

Referring to FIG. 1, the reel 14 is attached to a basal portion 22 of the rod 12. A power supply terminal and a communication terminal (not shown) are incorporated in the basal portion 22 of the rod 12.

An acceleration sensor 32 is arranged at a distal portion 24 of the rod 12. When the reel 14 is attached to the rod 12, a power supply device (not shown), which is arranged in the reel 14, supplies power to the acceleration sensor 32 via the power supply terminal. The acceleration sensor 32 is preferably a tri-axial capacitance type acceleration sensor, which detects acceleration in the directions of an x-axis, y-axis, and z-axis. The acceleration sensor 32 is connected to the control system in the reel 14 by a signal wire (not shown), which extends through a rod body 26.

The reel 14 includes a reel body 42, a rotatable spool 44 arranged on the reel body 42, a microcomputer 46 (FIG. 2) incorporated in the reel body 42, a rotation sensor 48 (FIG. 2) for detecting rotation of the spool 44, and a brake mechanism 50 (FIG. 2) for electronically braking rotation of the spool 44. The reel 14 also includes a user interface 52 (FIG. 2) for setting the operation of the microcomputer 46. Although not shown, the reel 14 also includes a handle for manually rotating the spool 44, a clutch lever for selectively switching the spool 44 between a free state and a locked state 4, and a mechanical brake for adjusting the rotation degree of the spool 44.

A fishing line 16 is wound around the spool 44. The fishing line 16 has a basal end fixed to the spool 44 and a distal end (free end) drawn out of the spool 44, and guided to the distal end of the rod 12 through a group of guides 18 arranged on the rod 12. As shown in FIG. 1, a weight 20 such as lure is attached to the distal end of the fishing line 16 drawn out of the rod 12.

Figure 2:
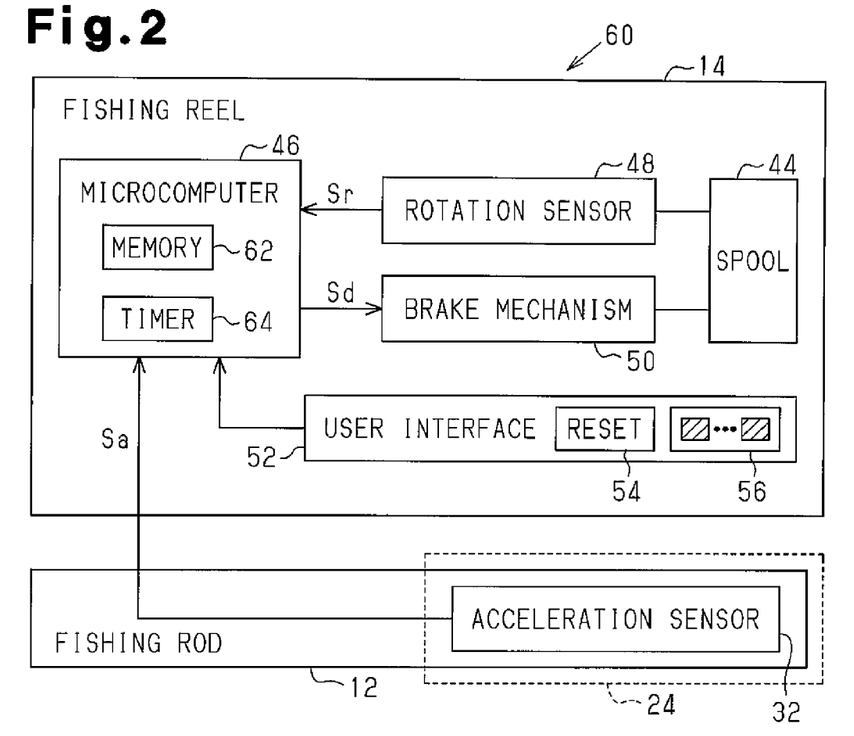
FIG. 2 is a schematic block diagram of a spool braking device for the fishing device of FIG. 1.

FIG. 2 is a schematic block diagram showing a spool braking device 60 in the preferred embodiment. The microcomputer 46 includes a memory 62 and a timer 64. The memory 62 stores a spool braking program, which contains a group of commands executable by the microcomputer 46, and a group of initial parameters used by the microcomputer 46 when executing the program. The memory 62 also stores a group of control parameters obtained by the microcomputer 46 when executing the program. The microcomputer 46 executes the spool braking program and uses acceleration information from the acceleration sensor 32 to drive the brake mechanism 50. In addition to the acceleration information from the acceleration sensor 32, the microcomputer 46 may use rotation information from the rotation sensor 48 when driving the brake mechanism 50. Accordingly, the microcomputer 46 functions as a brake control unit. The microcomputer 46 also uses the acceleration information to calculate an estimated casting distance Xd, which is the distance from a casting point where the user casts the fishing line 16 (including the weight 20) to a landing point where the fishing line 16 lands on water (hereinafter referred to as "landing point"). Based on the estimated casting distance Xd, the microcomputer 46 drives the brake mechanism 50.

The rotation sensor 48 detects rotation of the spool 44 and generates a rotation signal Sr. A magnetic sensor, an optical sensor, or the like may be used as the rotation sensor 48. The microcomputer 46 determines the rotation speed Vs of the spool 44 based on the rotation signal Sr from the rotation sensor 48. The spool rotation speed Vs relates to the actual cast amount of the fishing line 16 drawn out of the spool 44.

The brake mechanism 50 electronically brakes rotation of the spool 44 in response to a drive control signal Sd from the microcomputer 46. The magnet brake mechanism 50 may be formed by a plurality of magnets that apply magnetic torque to the spool 44 to adjust the rotation speed.

When the user swings the rod 12, the acceleration sensor 32, which is arranged at the distal portion 24, detects the swing acceleration and generates an acceleration signal Sa. When the fishing line 16 is cast, the microcomputer 46 monitors the user's swing motion based on the acceleration signal Sa from the acceleration sensor 32. During the casting, the microcomputer 46 calculates a plurality of control parameters, which include an initial speed $V_0$, projection angle $\theta$, spool rotation initiation period Ts, estimated line speed $V_L$, estimated cast line amount $D_L$, and estimated casting distance Xd of the fishing line 16 (including the weight 20 such as lure) based on the monitor result. The initial speed $V_0$ is the speed the fishing line 16 (weight 20) is cast from the rod 12 when the rod is located at a casting swing termination position. The projection angle $\theta$ is the angle at which the fishing line 16 (weight 20) is cast from the rod 12 at the casting swing termination position. The spool rotation initiation period Ts is the expected period from when the casting swing of the rod 12 is terminated to when the spool 44 starts to rotate. The estimated line speed $V_L$ is the estimated speed of the fishing line 16 that is being cast. The estimated cast line amount $D_L$ is the estimated cast amount of the fishing line 16 drawn out of the spool 44 at the estimated line speed $V_L$. The estimated casting distance Xd is the casting distance of the fishing line 16 from the casting point to the landing point.

The user interface (hereinafter referred to as "UI") 52 includes a reset button 54 for initializing the operation of the microcomputer 46. When the user pushes the reset button 54, the microcomputer 46 resets output information (Sa, Sr) of the acceleration sensor 32 and the rotation sensor 48. Further, when the reset button 54 is pushed, the microcomputer 46 stores in the memory 62 the height level of the rod 12 as water surface level Yw (e.g., "0").

The UI 52 further includes a plurality of parameter switches 56 manually operated by the user to input and set the group of initial parameters. The user may change the casting conditions (i.e., initial parameter group) by operating the parameter switches 56. Accordingly, the UI 52 serves as a parameter setting unit. In the preferred embodiment, the UI 52 includes three parameter switches 56 for setting a height parameter C1, a mass parameter C2, and a weather parameter C3, respectively. Although not shown in the drawings, the UI 52 also includes a start button.

The height parameter C1 indicates the height (hereinafter referred to as "initial height") of the distal portion 24 of the rod 12 from the water surface level Yw when the rod 12 is located at the casting swing termination position. That is, the initial height is the height level of the rod 12 when the fishing line 16 is cast from the rod 12. The parameter switch 56 for setting the height parameter C1 may be configured so as to enable the initial height to be set at any value or to enable adjustment of the initial height in fixed steps.

The mass parameter C2 indicates the mass of the weight 20 attached to the fishing line 16. The parameter switch 56 for setting the mass parameter C2 may be configured so as to enable the mass of the weight 20 to be set at any value or to enable adjustment of the mass in fixed steps.

The weather parameter C3 indicates weather conditions such as the wind direction, wind speed, weather, and the like. In the preferred embodiment, the microcomputer 46 recognizes the weather parameter C3 as an air resistance coefficient. The parameter switch 56 for setting the weather parameter C3 includes a plurality of preset buttons. When the user pushes a predetermined preset button that corresponds to the weather condition (sunny, rain, wind speed, wind direction, or the like), an air resistance coefficient corresponding to the pushed preset button is stored in the memory 62.

Figure 3:
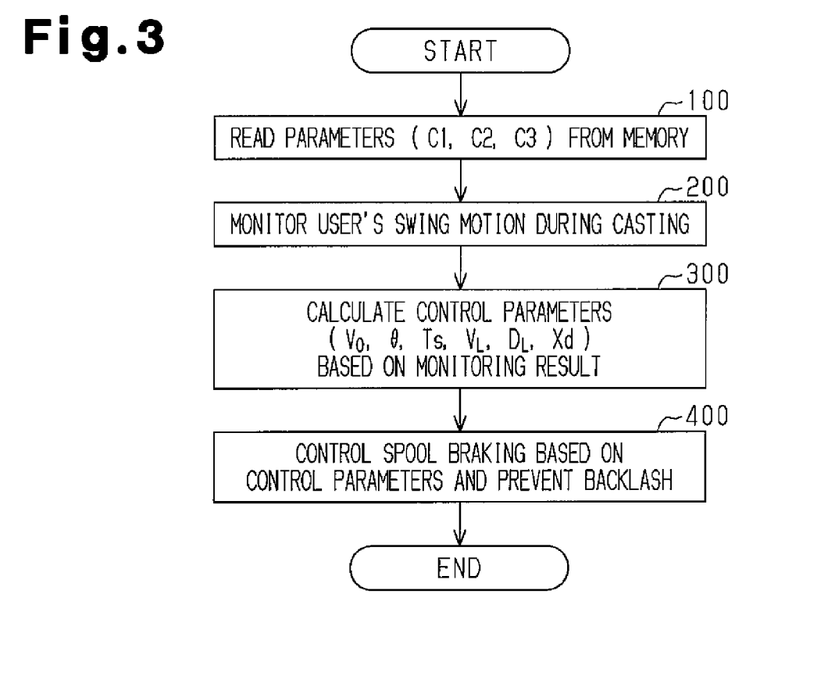
FIG. 3 is a schematic flowchart illustrating a spool brake control executed in the preferred embodiment.

The operation of the spool braking device 60 will now be discussed with reference to FIGS. 3 to 6. FIG. 3 is a flowchart summarizing the spool brake control.

Before starting step 100, the user initializes the spool braking device 60 as described below.

(A) The rod 12 is held at a position (e.g., ground surface) that is substantially the same height as the water surface, and the reset button 54 is pushed to set the water surface level Yw ("0") in the microcomputer 46.

(B) The parameter switches 56 are operated to set the initial parameters (i.e., height parameter C1, mass parameter C2, and weather parameter C3) in the microcomputer 46.

(C) The start button of the microcomputer 46 is pushed (this operation may be omitted).

In step 100, the microcomputer 46 reads the initial parameters C1, C2, and C3 from the memory 62 when the user pushes the start button.

In step 200, the microcomputer 46 monitors the user's swing motion with the acceleration sensor 32.

In step 300, based on the monitoring result of the swing motion, the microcomputer 46 calculates the control parameters (i.e., initial speed $V_0$, projection angle $\theta$, spool rotation initiation period Ts, estimated line speed $V_L$, estimated cast line amount $D_L$, estimated casting distance Xd) used for executing brake control on the spool 44.

In step 400, the microcomputer 46 performs a spool braking process, which includes backlash prevention control, based on the calculated control parameters. Step 400 is continuously performed until the spool rotation speed Vs becomes zero. When step 400 is completed, the spool brake control ends, and the user starts fishing.

Figure 4:
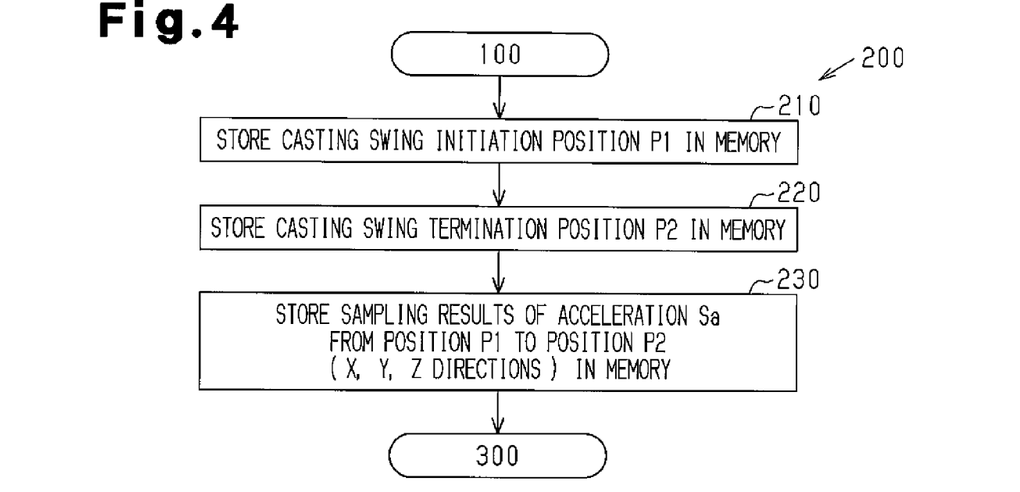
FIG. 4 is a flowchart illustrating in detail a swing monitoring process (step 200) of FIG. 3.

FIG. 4 is a flowchart showing the swing monitoring process of step 200 in detail. In step 210, the microcomputer 46 determines a casting swing initiation position P1 of the rod 12 from the acceleration signal Sa and stores the position P1 in the memory 62. For example, when the direction of the user facing the casting point is the positive direction, acceleration in the negative direction shifts from a positive value to zero at the position where the user stops the casting swing of the rod 12. Therefore, the microcomputer 46 recognizes the position P1 when detecting a change in acceleration in the negative direction.

In step 220, the microcomputer determines a casting swing termination position P2 of the rod 12 from the acceleration detection signal Sa and stores the position P2 in the memory 62. Specifically, when the rod 12 reaches the casting swing termination position P2, acceleration in the positive direction shifts from a positive value to zero. Therefore, the microcomputer 46 recognizes the position P2 by detecting a change in acceleration in the positive direction.

In step 230, the microcomputer 46 stores in the memory 62 swing accelerations (Sa) for the X, Y, and Z directions sampled during a swing period in which the rod 12 was swung from position P1 to position P2. Specifically, the microcomputer 46 samples accelerations for the X, Y, and Z directions in extremely short time cycles (e.g., several milliseconds) during the swing period and stores in the memory 62 the accelerations sampled in each cycle. Accordingly, the memory 62 stores each of the sampled accelerations for the X, Y, and Z directions during the swing period in which the rod 12 is swung from position P1 to position P2.

Figure 5:
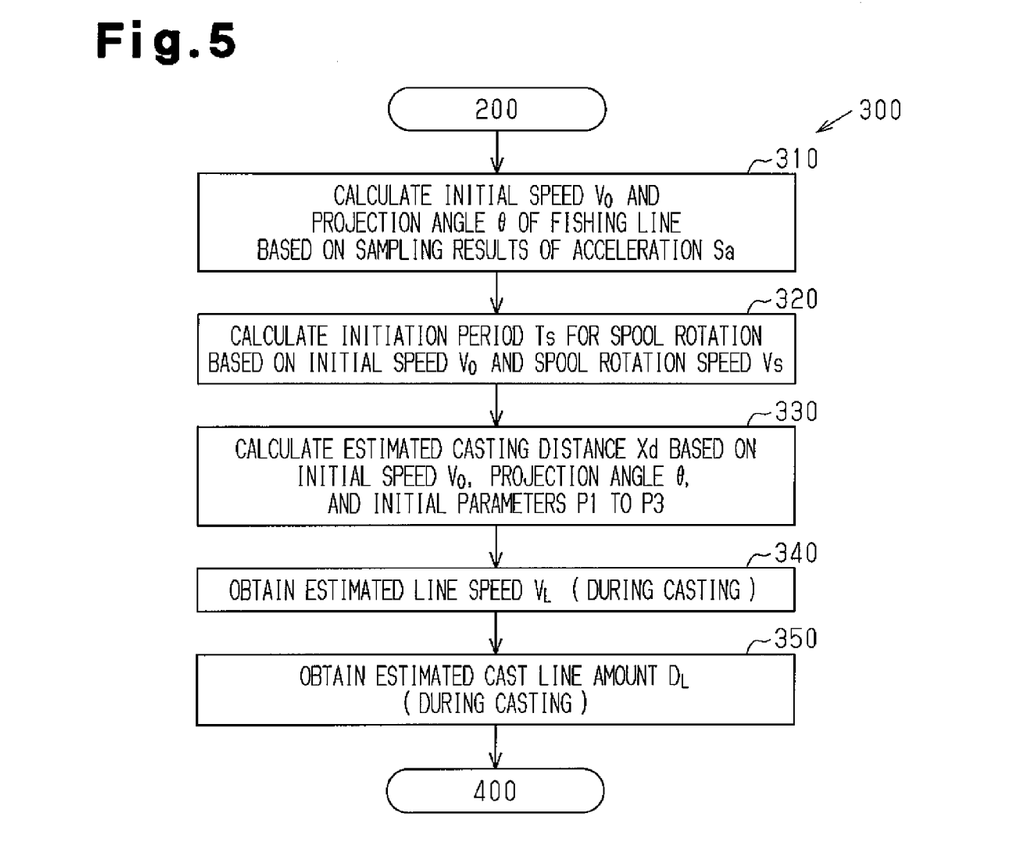
FIG. 5 is a flowchart illustrating in detail a control parameter calculating process (step 300) of FIG. 3.

FIG. 5 is a flowchart showing the control parameter calculation process of step 300 in detail. In step 310, the microcomputer 46 uses all of the sampled accelerations stored in the memory 62 to calculate the initial speed $V_0$ and the projection angle $\theta$. As known in the art, speed is obtained by integrating acceleration. In the preferred embodiment, the microcomputer 46 calculates the speed for each cycle from the corresponding sampled accelerations and the speed of the previous cycle. The same calculation is repeated for each cycle until obtaining the speed at the position P2 (i.e., initial speed $V_0$). The microcomputer 46 then calculates the projection angle $\theta$ based on the calculated initial speed $V_0$ in the X, Y, and Z directions. Calculations are not limited in such a manner, and the microcomputer 46 may obtain the initial speed $V_0$ by calculating the speed in real time for every sampling cycle.

In step 320, the microcomputer 46 calculates the spool rotation initiation period Ts based on the initial speed $V_0$ and the spool rotation speed Vs. Specifically, the microcomputer 46 sets as a reference time ("0") the time when the casting swing termination position P2 is detected. Then, the microcomputer 46 estimates the period from the reference time until when the spool 44 starts to rotate (i.e., Vs>0) based on the initial speed $V_0$. When the weight 20 is connected to the fishing line 16 at a distance of about 15 to 20 cm from the distal end of the rod 12, and the initial speed $V_0$ is 50 km/h (1.3 mm/mS), the microcomputer 46 calculates the spool rotation initiation period Ts as being about 115 to 154 mS. That is, the microcomputer 46 predicts that the spool 44 will start to rotate after about 115 to 154 mS from the reference time. Accordingly, although not shown in the drawings, the microcomputer 46 determines that a casting error has occurred if rotation of the spool 44 (Vs>0) is not detected after time Ts elapses. In such a case, the microcomputer 46 performs spool braking. The spool rotation initiation period Ts may include a margin.

In step 330, the microcomputer 46 uses the two control parameters calculated in step 310 (initial speed $V_0$ and projection angle $\theta$) and three initial parameters (height parameter C1, mass parameter C2, and weather parameter C3) to calculate the estimated casting distance Xd from equations 1 and 2.

$$Xd = \frac{C2 * V_0}{C3}\left(1 - e^{-\frac{C3}{C2}t}\right)\cos\theta \qquad \text{[Equation 1]}$$

$$Yw = \frac{C2}{C3}\left\{\left(V_0\sin\theta + \frac{C2}{C3}g\right)\left(1 - e^{-\frac{C3}{C2}t}\right) - gt\right\}C1 \qquad \text{[Equation 2]}$$

Here, g represents the gravitational acceleration and t represents the elapsed casting time. By using equations 1 and 2, the microcomputer 46 can calculate the estimated casting distance Xd between where the fishing line 16 (weight 20) is cast to where the fishing line 16 lands on water (i.e., the water surface level Yw is to be zero) irrespective of time t. In equations 1 and 2, the mass parameter C2 and the weather parameter C3 are used as air resistance parameters. If such air resistance parameters (C2 and C3) are not taken into consideration, the microcomputer 46 may simply calculate the estimated casting distance Xd from equations 3 and 4.

$$Xd = V_0 t\cos\theta \qquad \text{[Equation 3]}$$

$$Yw = -\frac{1}{2}gt^2 + V_0 t\sin\theta + C1 \qquad \text{[Equation 4]}$$

In step 340, the microcomputer 46 measures the elapsed casting time t with the timer 64. Further, the microcomputer 46 uses the initial speed $V_0$, the projection angle $\theta$, the initial parameters (C2 and C3), and the elapsed casting time t to obtain the estimated line speed $V_L$ from the following equation 5.

$$V_L = V_0 e^{-\frac{C3}{C2}t}\cos\theta \qquad \text{[Equation 5]}$$

The calculation of the estimated line speed $V_L$ is continuously performed throughout the casting period. If the air resistances (C2 and C3) are not taken into consideration, the microcomputer 46 can simply calculate the estimated line speed $V_L$ from the following equation 6.

$$V_L = V_0 \cos\theta \quad \text{[Equation 6]}$$

In step 350, the microcomputer 46 obtains the estimated cast line amount $D_L$ ($D_L = V_L \times t$) using the calculated estimated line speed $V_L$ and the elapsed casting time t. The calculation of the estimated cast line amount $D_L$ is also continuously performed over the casting period.

Figure 6:
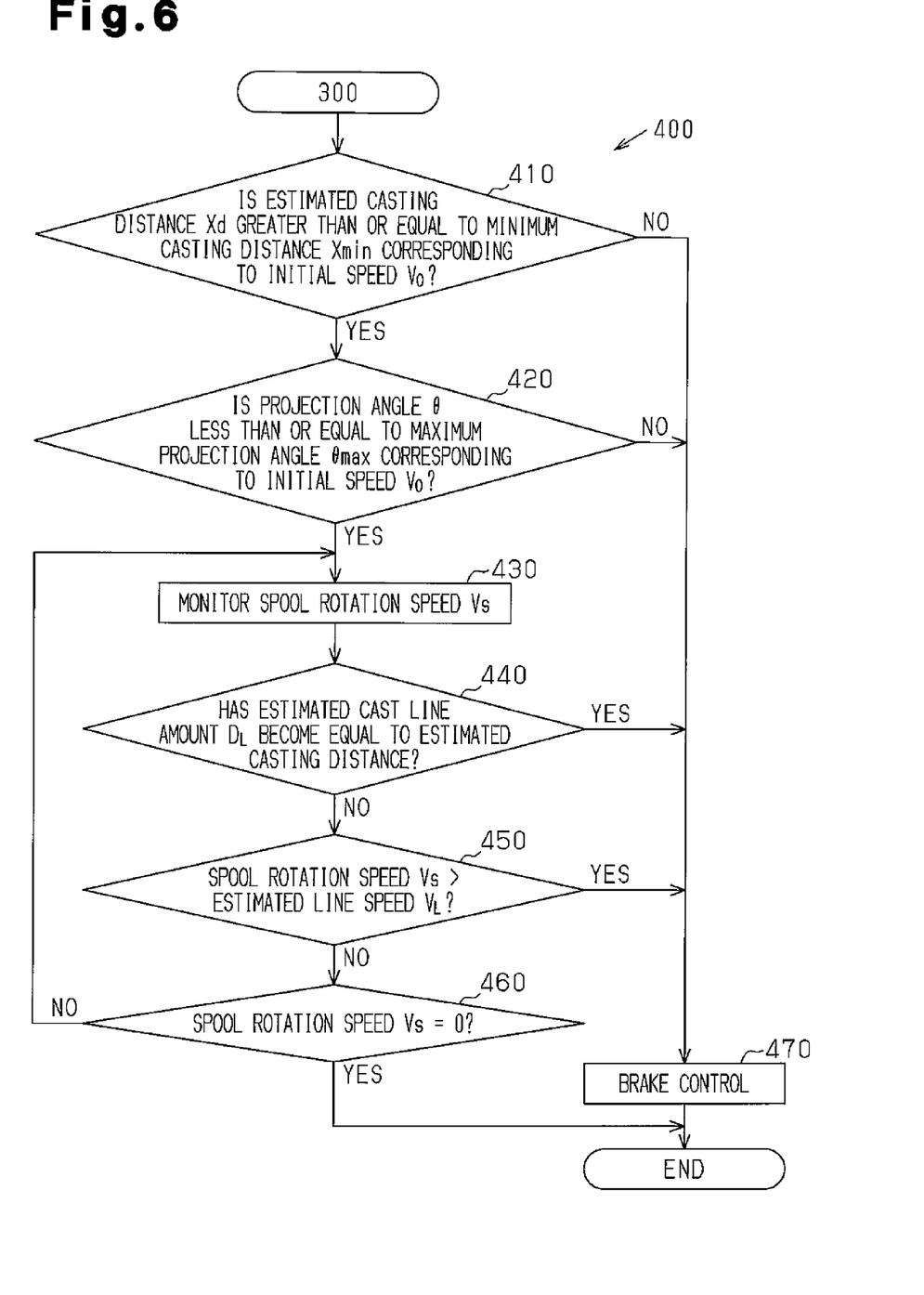
FIG. 6 is a flowchart illustrating in detail a spool braking process (step 400) of FIG. 3.

FIG. 6 is a flowchart showing the spool braking process of step 400 in detail. First, in step 410, the microcomputer 46 determines whether or not the estimated casting distance Xd is greater than or equal to a minimum casting distance Xmin corresponding to the initial speed $V_0$ (current calculated value). For example, if the estimated casting distance Xd is extremely short even though the initial speed $V_0$ is high, the probability of a casting error occurring is high. Factors causing such a casting error include the projection angle θ being too small. Accordingly, the minimum casting distance Xmin corresponding to the initial speed $V_0$ is stored in the memory 62 of the microcomputer 46 as a first threshold value. A minimum casting distance Xmin may be set for each initial speed $V_0$. Alternatively, minimum casting distances Xmin may be set in a stepped manner with each corresponding to a plurality of initial speeds within a predetermined range. In step 410, if the estimated casting distance Xd is less than the minimum casting distance Xmin that corresponds to the initial speed $V_0$, the microcomputer 46 executes brake control (step 470). Otherwise, the microcomputer 46 proceeds to step 420.

In step 420, the microcomputer 46 determines whether or not the projection angle θ is less than or equal to a maximum projection angle θmax corresponding to the initial speed $V_0$ (current calculated value). That is, if the projection angle θ is extremely large even though the initial speed $V_0$ is high, the probability of a casting error occurring is high. Accordingly, the maximum projection angle θmax corresponding to the initial speed $V_0$ is stored in the memory 62 of the microcomputer 46 as a second threshold value. A maximum projection angle θmax may be set so for each initial speed $V_0$. Alternatively, maximum projection angles θmax may be set in a stepped manner with each corresponding to a plurality of initial speeds within a predetermined range. In step 420, if the projection angle θ is greater than the maximum projection angle θmax that corresponds to the initial speed $V_0$, the microcomputer 46 executes brake control (step 470). Otherwise, the microcomputer 46 proceeds to step 430.

In step 430, the microcomputer 46 determines the spool rotation speed Vs based on the rotation signal Sr from the rotation sensor 48.

In step 440, the microcomputer 46 determines whether or not the estimated cast line amount $D_L$ has become equal to the estimated casting distance Xd. If the estimated cast line amount $D_L$ has become equal to the estimated casting distance Xd, the microcomputer 46 determines that the fishing line 16 has landed on water and executes brake control on the spool 44 (step 470). That is, the microcomputer 46 executes backlash prevention control based on the estimated cast line amount $D_L$ and the estimated casting distance Xd. The microcomputer 46 proceeds to step 450 if the estimated cast line amount $D_L$ is less than the estimated casting distance Xd.

In step 450, the microcomputer 46 determines whether or not the spool rotation speed Vs is greater than the estimated line speed $V_L$. If the spool rotation speed Vs is greater than the estimated line speed $V_L$, the microcomputer 46 performs the brake control (step 470). Otherwise, the microcomputer 46 proceeds to step 460.

In step 460, the microcomputer 46 determines whether or not the spool rotation speed Vs is zero. If the spool rotation speed Vs is zero, the microcomputer 46 terminates further processing (brake control). Otherwise, the microcomputer 46 returns to step 430. The microcomputer 46 then repeats step 430 to step 460 until the spool rotation speed Vs becomes zero.

The spool braking device 60 of the preferred embodiment has the advantages described below.

The microcomputer 46 uses estimates based on the swing acceleration of the rod 12 to determine whether or not the spool 44 needs to be braked. This avoids delays in the brake timing.

The acceleration sensor 32 is arranged at the distal portion 24 of the rod 12. This enables the swing acceleration of the rod 12 to be accurately detected.

The time until the fishing line 16 lands on water is predicted from the estimated casting distance Xd. This prevents delays in execution of the backlash prevention control.

The microcomputer 46 calculates from the swing acceleration of the rod 12 the plurality of control parameters (initial speed $V_0$, projection angle θ, spool rotation initiation period Ts, estimated line speed $V_L$, estimated cast line amount $D_L$, estimated casting distance Xd) for performing spool braking. Accordingly, the spool braking capability is improved with the use of a single acceleration sensor 32.

The microcomputer 46 drives the brake mechanism 50 when the estimated casting distance Xd is less than the minimum casting distance Xmin that corresponds to the initial speed $V_0$ or when the projection angle θ is greater than the maximum projection angle θmax that corresponds to the initial speed $V_0$. Accordingly, the microcomputer 46 can perform spool braking while monitoring the casting of the fishing line 16.

The height parameter C1 indicating the initial height when the fishing line 16 is cast is set in the microcomputer 46. This increases accuracy for calculation of the estimated casting distance Xd.

The mass parameter C2 indicating the mass of the weight 20 and the weather parameter C3 indicating the weather condition are also set in the microcomputer 46. Thus, the air resistance that is taken into consideration increase accuracy for calculating the estimated casting distance Xd.

It should be apparent to those skilled in the art that the present invention may be embodied in many other specific forms without departing from the spirit or scope of the invention. Particularly, it should be understood that the invention may be embodied in the following forms.

The microcomputer 46 that executes the software is preferably employed as the brake control unit. However, hardware such as ASIC may be employed as the brake control unit.

The acceleration sensor 32 is most preferably arranged at the distal portion 24 of the rod 12 but may be arranged at the central part (rod body 26) of the rod 12. Alternatively, the acceleration sensor 32 may be arranged at the basal portion 22 of the rod 12 or in the reel 14. However, the detection accuracy of the swing acceleration increases when arranging the acceleration sensor 32 at positions closer to the distal portion of the rod 12.

The initial parameters may include a shape parameter indicating the shape of the weight 20 (e.g., lure shape). The shape of the weight 20 affects the air resistance. Accordingly, use of the shape parameter would increase accuracy for calculating the estimated casting distance Xd.

Instead of using both of the mass parameter C2 and the weather parameter C3 as the air resistance parameter, only one may be used.

A separate acceleration sensor may be arranged in the weight 20 to detect the actual speed of the fishing line 16. In this case, the microcomputer 46 can recognize the line speed that is more accurate than the estimated line speed $V_L$. This would, however, require a power supply and the implementation of a wireless communication function and thereby increase the volume and mass of the weight 20.

The present examples and embodiments are to be considered as illustrative and not restrictive, and the invention is not to be limited to the details given herein, but may be modified within the scope and equivalence of the appended claims.

What is claimed is:

1. A spool braking device for a fishing reel attached to a fishing rod in a detachable manner for use with a fishing line, the spool braking device comprising:
    a rotatable spool, arrangeable in the reel, for winding and unwinding the fishing line;
    a brake mechanism for electronically braking rotation of the spool;
    an acceleration sensor attached to the fishing rod for detecting swing acceleration of the fishing rod that is produced when the fishing rod is swung and generating an acceleration signal; and
    a brake control unit coupled to the acceleration sensor, wherein the brake control unit drives the brake mechanism and determines whether or not to brake the spool based on the acceleration signal, and wherein the brake control unit determines, based on the acceleration signal, an estimated casting distance of the fishing line from a casting point to a landing point where the fishing line lands on water, and drives the brake mechanism based on the estimated casting distance, and wherein the brake control unit includes a parameter setting unit for setting at least one initial parameter and changing a casting condition, and determines the estimated casting distance based on the at least one initial parameter and the acceleration signal, and wherein the at least one initial parameter includes a height parameter indicating a height of the fishing rod when the fishing line is cast from the fishing rod as the fishing rod reaches a casting swing termination position.

2. The spool braking device according to claim 1, wherein the fishing rod includes a basal portion to which the reel is attached and a distal portion opposite to the basal portion, the acceleration sensor being arrangeable on the distal portion of the fishing rod.

3. The spool braking device according to claim 1, wherein the brake control unit determines, based on the acceleration signal, an estimated cast line amount of the fishing line drawn out of the spool during a casting period, and drives the brake mechanism when the estimated cast line amount becomes equal to the estimated casting distance.

4. The spool braking device according to claim 1, wherein the brake control unit determines, based on the acceleration signal, an initial speed of the fishing line when the fishing line is cast from the fishing rod as the fishing rod reaches a casting swing termination position, and the brake control unit drives the brake mechanism when the estimated casting distance is less than a minimum casting distance that corresponds to the initial speed.

5. The spool braking device according to claim 1, wherein the at least one initial parameter includes
    at least one air resistance parameter indicating air resistance during a casting period.

6. The spool braking device according to claim 5, wherein the at least one air resistance parameter includes:
    a mass parameter indicating mass of a weight connected to the fishing line; and
    a weather parameter indicating an air resistance coefficient corresponding to a weather condition.

7. A spool braking device for a fishing reel, the reel being attached to a fishing rod and for use with a fishing line, the spool braking device comprising:
    a rotatable spool for winding and unwinding the fishing line;
    a brake mechanism for electronically braking rotation of the spool;
    an acceleration sensor, attached to a distal portion of the fishing rod, for detecting swing acceleration of the fishing rod produced when the fishing rod is swung, the acceleration sensor generating an acceleration signal; and
    a brake control unit, coupled to the acceleration sensor and the brake mechanism, that drives the brake mechanism, wherein the brake control unit determines whether to brake the spool based on the acceleration signal, and wherein the brake control unit determines, based on the acceleration signal, an initial speed and a projection angle of the fishing line when the fishing line is cast from the fishing rod as the fishing rod reaches a casting swing termination position, and the brake control unit drives the brake mechanism when the projection angle exceeds a predetermined maximum projection angle that corresponds to the initial speed.

8. The spool braking device according to claim 7, further comprising:
    a rotation sensor for detecting rotation of the spool, and generating a rotation signal;
    wherein the brake control unit drives the brake mechanism based on the acceleration signal and the rotation signal.

9. The spool braking device according to claim 8, wherein the brake control unit determines rotation speed of the spool during a casting period based on the rotation signal, determines an estimated speed of the fishing line during the casting period based on the acceleration signal, and drives the brake mechanism when the rotation speed of the spool exceeds the estimated speed of the fishing line.

10. A method for controlling braking of a rotatable spool arranged in a fishing reel, the reel being attached to a fishing rod in a detachable manner, and the reel including a brake mechanism for electronically braking rotation of the spool, and wherein the spool is wound with a fishing line, the method comprising:
    generating an acceleration signal indicative of acceleration of the fishing rod using an acceleration sensor attached to the fishing rod to detect swing acceleration produced when the fishing rod is swung;
    driving the brake mechanism by determining whether or not to brake the spool based on the acceleration signal;
    determining an initial speed and a projection angle of the fishing line when the fishing line is cast from the fishing rod as the fishing rod reaches a casting swing termination position based on the acceleration signal; and
    driving the brake mechanism when the projection angle is greater than a predetermined maximum projection angle that corresponds to the initial speed.

11. The method according to claim 10, further comprising:
    determining an estimated casting distance of the fishing line from a casting point to a landing point where the fishing line reaches water surface based on the acceleration signal; and driving the brake mechanism based on the estimated casting distance.

12. The method according to claim 11, further comprising:
determining an estimated cast line amount of the fishing line drawn out of the spool during a casting period based on the acceleration signal; and
driving the brake mechanism so as to equalize the estimated cast line amount and the estimated casting distance.

13. The method according to claim 11, further comprising:
determining the estimated casting distance based on the acceleration signal and at least one initial parameter that changes a casting condition.

14. The method according to claim 11, further comprising:
driving the brake mechanism when the estimated casting distance is less than a minimum casting distance that corresponds to the initial speed.

15. The method according to claim 10, further comprising:
generating a rotation signal by detecting rotation of the spool with a rotation sensor; and
driving the brake mechanism based on the acceleration signal and the rotation signal.

* * * * *